United States Patent Office 3,142,135
Patented July 28, 1964

3,142,135
PRODUCTION OF CAROTENOIDS BY THE CULTIVATION OF ALGAE
Henry R. Kathrein, Muscatine, Iowa, assignor to Grain Processing Corporation, Muscatine, Iowa, a corporation of Iowa
No Drawing. Filed Feb. 13, 1962, Ser. No. 172,880
10 Claims. (Cl. 47—58)

This invention relates to methods for the production of carotenoids. More specifically, this invention relates to an improved method for the production of beta- carotene and xanthophyll by the cultivation of a "grass green" alga of the botanical division Chlorophyta and particularly to a method involving cultivation of algae in an aqueous organic medium under conditions resulting in maximum carotenoid production.

It has been known that agae and particularly algae of the genus Chlorella can be propagated under mass culture conditions using a synthetic nutrient medium. Since carotenoids and xanthophyll have a number of uses, including that of a pigmentation factor for poultry, organic pigments for food coloration, and as chemical intermediates for the production of vitamins, it is highly desirable to provide a process which affords maximum yield of these materials.

It has now been found that the yield of beta-carotene and xanthophyll can be significantly improved by cultivating a "grass green" alga of the division of Chlorophyta in an aqueous organic nutrient medium containing a carbohydrate and an organic nitrogen source supplemented with limited amounts of inorganic ammonium or metal nitrates.

While the present process broadly includes algae of the division Chlorophyta, it is a preferred procedure to use an alga of the order Chlorococcales, family Oocystacease, and genus Spongiococcum or Chlorella of which latter genus the most preferred are the species *vulgaris* and *pyrenoidosa*.

The carbohydrate portion of the nutrient may be any assimilable starch or sugar such as glucose, dextrin, mannose, sorbose, arabinose, xylose, levulose, lactose, cellobiose, maltose, rhamnose, raffinose and the like. The organic nitrogen source is preferably a water-soluble proteinaceous material such as, for example, distillers' solubles syrup, soy albumin, lactalbumin, beef extract, whey, yeast hydrolyzate, casein hydrolyzate, corn steep liquor, enzymatically degraded collagenous material, or peptones in general. Generally the amounts of carbohydrate and proteinaceous material are variable. Thus, carbohydrate utilized may vary from about 0.5 to 10 percent by weight (dry) of the aqueous nturient medium, the most preferred amount being from about 2 to 3 percent by weight. The proteinaceous material can be utilized in the nutrient medium in an amount from about 0.1 to 5 percent calculated on a dry weight basis and preferably from about 0.4 to about 2.4 weight percent. The ratio of proteinaceous material to carbohydrate should preferably be from 0.1 to 0.5 weight percent for each 1 percent of carbohydrate.

It has been found that with respect to stimulation of carotene and xanthophyll production the amount of the inorganic nitrate to employ falls within a relatively narrow and critical range. According to our investigation, we have found that the inorganic ammonium or metal nitrate should be employed in an amount greater than about 0.05 weight percent. The maximum amount of inorganic nitrate to employ for optimum carotenoid stimulation varies with the specific inorganic ammonium or metal nitrate but in general is not more than about 2.0 percent by weight. Preferred inorganic nitrates to employ are ammonium nitrate, the alkali earth and alkaline earth metal nitrates such as sodium nitrate, potassium nitrate, calcium nitrate, magnesium nitrate and manganese nitrate. The amount of these inorganic ammonium or metal nitrates to employ is as follows:

Calcium nitrate_____ 0.05 to 2, preferred 0.1 to 0.6.
Ammonium nitrate_____ 0.05 to 0.4, preferred 0.1.
Sodium nitrate_____ 0.05 to 0.6, preferred 0.1 to 0.4.
Potassium nitrate_____ 0.05 to 0.6, preferred 0.1 to 0.4.
Magnesium nitrate_____ 0.05 to 0.6, preferred 0.1 to 0.4.
Manganese nitrate_____ 0.05 to 0.6, preferred 0.1 to 0.4.

The process of the present invention is preferably carried out at temperatures of from about 20° to 25° C., but temperatures of from 10° to 40° C. are also employed with good results. The pH does not appear to be a critical factor and accordingly the initial pH of the medium may range from as low as 5.8 to as high as 9.0 and a pH of from about 6.6 to 6.8 may be regarded as optimum. The length of time which is required for the production of good yields of beta-carotene and xanthophyll by the cultivation of algae may range from about 1 to about 15 days; however, under optimum conditions maximum growth and carotenoid yield are achieved in from about 2 to 11 days.

It is preferred that the process of the present invention be carried out under heterotrophic conditions and accordingly, since photosynthesis is not involved, a source of carbon dioxide is not required. However, the process is preferably carried out by accompanying aeration and agitation. It should also be noted that high illumination, as is the case under autotrophic conditions, is not necessary in this process, and good yields of carotenoids are obtained in the absence of light.

It should also be understood that while the foregoing description sets forth the basic nutrients to be utilized in the process of the present invention, it is also a part of this invention to include the necessary micronutrients and trace elements (which are well known to those skilled in this art) and which are required for proper proliferation and growth of the algae.

A clearer understanding of this invention may be had by reference to the following specific examples showing the production of beta-carotene and xanthophyll by processes of the present invention.

Example I

A series of culture media was made up containing 3.0% dextrose as carbohydrate source and 1.0% corn steep liquor as nitrogen source after inoculation. Other additions to the media were: potassium dihydrogen phosphate 0.01%, magnesium sulfate 0.01%, calcium chloride 0.005%, ferrous sulfate 0.008% and micronutrient solution 0.1%. This micronutrient solution contained 0.0286% boric acid, 0.0181% manganese chloride, 0.00222% zinc sulfate, 0.00079% copper sulfate, 0.00015% molybdic acid, 0.59% calcium nitrate, and 0.0004% cobalt chloride. The nitrates added to the individual media and levels employed were as follows: ammonium nitrate—0.05, 0.1 and 0.2%; sodium nitrate—0.1, 0.2, 0.4 and 0.6%; calcium nitrate—0.1, 0.2, 0.4, 0.6 and 0.8%; and magnesium nitrate—0.05, 0.1, 0.2, 0.4 and 0.6%. After the pH's were adjusted to a predetermined level so that after sterilization they would fall in the 6.7–7.0 range, triplicate flasks of 80 ml./500 ml. flask of each level and type of nitrate were prepared and sterilized 40 min. at 121° C. After the flasks were cooled, they were inoculated with 20 ml. of an 80 hour liquid culture of *Spongiococcum excentricum*. Incubation was carried out on a rotary shaker (200 r.p.m.) in a 28° C. incubator room for 64 hours. At termination, dry weights were made on the contents of the flasks and xanthophyll determinations made on the centrifuged cells. The results are shown in Table I.

*Table I*

The effect of varying levels of ammonium, sodium, potassium, calcium or magnesium nitrate upon xanthophyll production by the alga culture *Spongiococcum excentricum* in a medium consisting of 3.0% dextrose, 1.0% corn steep liquor and mineral salts:

| Nitrogen supplement | Level, percent | Dry wt.,[1] g./l. medium | Xanthophyll,[1] mg./g. dry cells | Xanthophyll, mg./l. medium |
|---|---|---|---|---|
| None | | 16.43 | 1.30 | 21.4 |
| Ammonium nitrate | 0.05 | 13.86 | 3.78 | 52.5 |
| Do | .1 | 15.49 | 4.41 | 64.1 |
| Do | .2 | 11.51 | 3.82 | 43.9 |
| Sodium nitrate | .1 | 13.75 | 3.97 | 54.6 |
| Do | .2 | 13.69 | 4.28 | 58.6 |
| Do | .4 | 13.10 | 4.50 | 58.9 |
| Do | .6 | 11.89 | 5.28 | 62.7 |
| Potassium nitrate | .1 | 15.05 | 3.17 | 47.7 |
| Do | .2 | 13.64 | 3.47 | 47.3 |
| Do | .4 | 13.76 | 4.15 | 57.1 |
| Do | .6 | 12.72 | 4.34 | 55.1 |
| Calcium nitrate | .1 | 16.61 | 2.22 | 36.9 |
| Do | .2 | 15.98 | 3.03 | 48.5 |
| Do | .4 | 15.40 | 4.43 | 68.1 |
| Do | .6 | 13.43 | 4.95 | 66.4 |
| Do | .8 | 14.28 | 4.38 | 62.5 |
| Magnesium nitrate | .05 | 16.25 | 2.09 | 34.0 |
| Do | .1 | 16.83 | 2.50 | 42.0 |
| Do | .2 | 15.11 | 3.01 | 47.3 |
| Do | .4 | 14.59 | 4.00 | 58.3 |
| Do | .6 | 13.56 | 4.63 | 62.7 |

[1] Average of three individual flasks.

EXAMPLE II

A series of culture media was made up containing 2.0% dextrose as carbohydrate source and 1.0% corn steep liquor as nitrogen source. Other additions to the media were: potassium dihydrogen phosphate 0.01%, magnesium sulfate 0.01%, calcium chloride 0.005%, ferrous sulfate 0.008% and micronutrient solution 0.1%. The nitrates added to the individual media and levels employed were as follows: Ammonium nitrate—0.05, 0.1 and 0.2%; sodium nitrate—0.1, 0.2, 0.4 and 0.6%; potassium nitrate—0.1, 0.2, 0.4 and 0.6%; calcium nitrate—0.1, 0.2, 0.4, 0.6 and 0.8%; and magnesium nitrate—0.05, 0.1, 0.2, 0.4 and 0.6%. After the pH's were adjusted to a predetermined level so that after sterilization they would fall in the 6.7–7.0 range, triplicate flasks of 80 ml./500 ml. flask of each level and type of nitrate were prepared and sterilized 40 min. at 121° C. The 80 ml. volume, although containing ingredients for 100 ml., was used so that when the 20 ml. of inoculum was introduced into the flasks the above mentioned ingredient levels would be correct. After the flasks were cooled, they were inoculated with 20 ml. of an 80 hour liquid culture of *Spongiococcum excentricum*. Incubation was carried out on a rotary shaker (200 r.p.m.) in a 28° C. incubator room for 64 hours. At 16 hours fermentation each flask was fed an additional 2.0% dextrose giving a total of 4.0% dextrose. At termination, dry weights were made on the contents of the flasks and xanthophyll determinations made on the centrifuged cells. The results are shown in Table II.

*Table II*

The effect of varying levels of ammonium, sodium, potassium, calcium or magnesium nitrate upon xanthophyll production by the alga culture *Spongiococcum excentricum* in a medium consisting of 4.0% dextrose, 1.0% corn steep liquor and mineral salts:

| Nitrogen supplement | Level, percent | Dry wt., g./l. medium | Xanthophyll, mg./g. dry cells | Xanthophyll, mg./l. medium |
|---|---|---|---|---|
| None | | 17.89 | 1.76 | 31.4 |
| Ammonium nitrate | 0.05 | 12.21 | 2.41 | 29.4 |
| Do | .1 | 20.00 | 2.79 | 55.8 |
| Do | .2 | 10.97 | 2.78 | 30.5 |
| Sodium nitrate | .1 | 20.81 | 2.55 | 53.0 |
| Do | .2 | 17.83 | 3.56 | 63.5 |
| Do | .4 | 17.99 | 4.57 | 82.2 |
| Do | .6 | 15.11 | 3.59 | 54.3 |
| Potassium nitrate | .1 | 20.44 | 2.46 | 50.2 |
| Do | .2 | 17.40 | 3.33 | 58.0 |
| Do | .4 | 17.25 | 4.57 | 78.8 |
| Do | .6 | 15.76 | 4.92 | 77.5 |
| Calcium nitrate | .4 | 20.01 | 4.17 | 83.5 |
| Do | .6 | 19.64 | 4.43 | 87.0 |
| Do | .8 | 21.14 | 3.93 | 83.1 |
| Do | 1.0 | 19.62 | 3.78 | 74.1 |
| Do | 1.5 | 19.74 | 3.00 | 59.3 |
| Magnesium nitrate | .05 | 23.17 | 1.73 | 40.1 |
| Do | .1 | 22.71 | 1.79 | 40.6 |
| Do | .2 | 20.53 | 2.17 | 44.5 |
| Do | .4 | 19.73 | 2.92 | 57.6 |
| Do | .6 | 19.22 | 3.83 | 73.7 |

EXAMPLE III

*Table III*

The effect of low levels of sodium, potassium, ammonium, calcium or magnesium nitrate upon xanthophyll production by the algae culture *Spongiococcum excentricum* in a medium consisting of 3.0% dextrose, 1.0% corn steep liquor and mineral salts:

| Nitrogen supplement | Level, percent | Dry wt.,[1] g./l. medium | Xanthophyll Mg./g. dry cells | Xanthophyll Mg./l. medium |
|---|---|---|---|---|
| Sodium nitrate | 0.01 | 16.07 | 0.96 | 15.4 |
| | .02 | 16.49 | .93 | 15.4 |
| | .04 | 14.80 | 1.06 | 15.7 |
| | .08 | 14.15 | 1.82 | 25.8 |
| | .1 | 13.05 | 1.92 | 25.1 |
| Potassium nitrate | .01 | 15.81 | .96 | 15.1 |
| | .02 | 14.99 | 1.16 | 17.4 |
| | .04 | 15.28 | 1.50 | 22.9 |
| | .08 | 14.56 | 1.81 | 26.4 |
| | .1 | 14.41 | 2.03 | 29.3 |
| Ammonium nitrate | .01 | 14.02 | 1.28 | 18.0 |
| | .02 | 14.56 | 1.35 | 19.6 |
| | .04 | 13.13 | 2.10 | 27.6 |
| | .08 | 11.01 | 2.49 | 27.4 |
| | .1 | 11.77 | 2.80 | 32.9 |
| Calcium nitrate | .01 | 14.07 | 1.09 | 15.4 |
| | .02 | 13.58 | 1.17 | 15.9 |
| | .04 | 15.51 | 1.12 | 17.4 |
| | .08 | 15.41 | 1.55 | 23.9 |
| | .1 | 15.61 | 1.54 | 24.0 |
| Magnesium Nitrate | .01 | 14.03 | 1.10 | 15.5 |
| | .02 | 14.63 | .94 | 13.8 |
| | .04 | 15.18 | 1.14 | 17.3 |
| | .08 | 14.97 | 1.01 | 15.1 |
| | .1 | 14.69 | 1.24 | 18.2 |
| None | 0 | 16.46 | .97 | 15.0 |

[1] Average of 3 flasks.

As shown by the above data the inorganic nitrates are required to be employed in amounts more than about 0.05% in order to achieve appreciable benefit.

EXAMPLE IV

*Table IV*

The effect of low levels of sodium, potassium, ammonium, calcium or magnesium nitrate upon xanthophyll production by the algae culture *Spongiococcum excentri-* cum in a medium consisting of 3.0% dextrose, mineral salts and *no* corn steep liquor:

| Nitrogen supplement | Level, percent | Dry wt.,[1] g./l. medium | Xanthophyll [1] | |
|---|---|---|---|---|
| | | | Mg./g. dry cells | Mg./l. medium |
| Sodium nitrate | 0.01 | 6.48 | 0.77 | 5.0 |
| | .02 | 7.51 | .97 | 7.3 |
| | .04 | 8.51 | 1.05 | 8.9 |
| | .08 | 11.10 | 1.17 | 13.0 |
| Potassium nitrate | .01 | 6.20 | .87 | 5.4 |
| | .02 | 8.61 | .66 | 5.7 |
| | .04 | 8.21 | .80 | 6.6 |
| | .08 | 10.73 | .96 | 10.3 |
| Ammonium nitrate | .01 | 7.35 | .86 | 6.3 |
| | .02 | 10.43 | 1.10 | 11.5 |
| | .04 | 11.48 | .96 | 11.0 |
| | .08 | 4.69 | 1.68 | 7.9 |
| Calcium nitrate | .01 | 7.54 | .78 | 5.9 |
| | .02 | 9.25 | .76 | 7.0 |
| | .04 | 9.89 | .78 | 7.7 |
| | .08 | 12.77 | | |
| Magnesium nitrate | .01 | 7.19 | .46 | 3.3 |
| | .02 | 7.62 | .52 | 4.0 |
| | .04 | 8.43 | .58 | 4.9 |
| | .08 | 11.25 | .52 | 5.8 |
| None | | 5.15 | .68 | 3.5 |

[1] Average of 3 flasks.

Comparison of Examples III and IV shows that an organic nitrogen source is required for maximum production.

EXAMPLE V

The production of xanthophyll by *Spongiococcum excentricum* in media containing corn steep liquor, brewer's yeast or liver concentrate as organic nitrogen source and sodium, potassium, or calcium nitrate as inorganic nitrogen supplement is illustrated in the following table.

*Table V*

| Organic nitrogen | Level, percent | Inorganic nitrogen | Level, percent | Dry wt., g./l. medium | Xanthophyll | |
|---|---|---|---|---|---|---|
| | | | | | Mg./g. dry cells | Mg./l. medium |
| C.S.L. | 1.0 | 0 | 0 | 15.43 | 0.51 | 7.8 |
| C.S.L. | 1.0 | NaNO₃ | 0.4 | 12.43 | 4.03 | 50.1 |
| C.S.L. | 1.0 | KNO₃ | 0.4 | 13.74 | 3.48 | 47.8 |
| C.S.L. | 1.0 | CaNO₃ | 0.8 | 15.79 | 3.86 | 60.9 |
| Brewer's yeast | 0.5 | 0 | 0 | 9.41 | 1.74 | 16.4 |
| Brewer's yeast | 0.5 | NaNO₃ | 0.4 | 12.28 | 4.08 | 50.1 |
| Brewer's yeast | 0.5 | KNO₃ | 0.4 | 13.29 | 4.06 | 53.9 |
| Brewer's yeast | 0.5 | CaNO₃ | 0.8 | 15.53 | 3.50 | 54.4 |
| Liver concentrate | 0.5 | 0 | 0 | 8.59 | .54 | 4.6 |
| Liver concentrate | 0.5 | NaNO₃ | 0.4 | 12.43 | 3.34 | 41.5 |
| Liver concentrate | 0.5 | KNO₃ | 0.4 | 12.86 | 3.00 | 38.6 |
| Liver concentrate | 0.5 | CaNO₃ | 0.8 | 16.15 | 2.54 | 41.0 |

Basal medium:
Dextrose --- 3.0%.
$KH_2PO_4$ --- 0.01.
$MgSO_4$ --- 0.01.
$CaCl_2$ --- 0.005.
Micronutrient sol --- 1.0 ml./l. med.
$FeSO_4$ sol --- 2.0 ml./l. med.

EXAMPLE VI

A series of culture media was made up containing 4.0% dextrose, 1.5% corn steep liquor, 0.1% sodium acetate, 0.01% $MgSO_4$, 0.01% $KH_2PO_4$, 0.005% $CaCl_2$ and varying levels of nitrates. The nitrates added to the individual media and levels employed were as follows: ammonium nitrate—0.05, 0.1 and 0.2%; sodium nitrate—0.1, 0.2, 0.3 and 0.4%; potassium nitrate—0.1, 0.2, 0.3 and 0.4%; and calcium nitrate—0.1, 0.2, 0.3 and 0.4%. After the pH's were adjusted to a predetermined level so that after sterilization they would fall in the 67—7.0 range, triplicate flasks of 100 ml./500 ml. flask of each level and type of nitrate were prepared and sterilized 40 min. at 121° C. After the flasks cooled, they were inoculated with 3.0 ml. of a 5 day liquid culture of Chlorella Sorokin strain TX 71105. Incubation was carried out on a rotary shaker (200 r.p.m.) in a 28° C. incubator room for 7 days. At termination, xanthophyll determinations were made on the centrifuged cells. As shown in Table VI, all the nitrates tried proved to be stimulatory to xanthophyll production.

*Table VI*

The effect of varying levels of ammonium, calcium, sodium, or potassium nitrate upon carotenoid production by the alga culture Chlorella Sorokin strain TX 71105 in a medium consisting of 4.0% dextrose, 1.5% corn steep liquor and mineral salts:

| Nitrogen supplement | Level, percent | Xanthophyll, mg./l. medium |
|---|---|---|
| None | | 16.9 |
| Ammonium nitrate | 0.05 | 24.4 |
| | .1 | 38.2 |
| | .2 | 52.0 |
| Sodium nitrate | .1 | 23.4 |
| | .2 | 35.0 |
| | .3 | 38.2 |
| | .4 | 60.5 |
| Potassium nitrate | .1 | 22.3 |
| | .2 | 24.4 |
| | .3 | 29.7 |
| | .4 | 35.0 |
| Calcium nitrate | .1 | 23.4 |
| | .2 | 30.8 |
| | .3 | 44.6 |
| | .4 | 53.0 |

EXAMPLE VII

A series of 500 ml. culture flasks was made up containing 100 ml. of a medium consisting of 2.0% dextrose, 0.8% corn steep liquor, 0.1% sodium acetate, 0.004% $KH_2PO_4$, 0.004% $MgSO_4$, 0.002% $CaCl_2$, 0.0001% $FeSO_4$, 0.003% ethylene diamine tetra acetic acid, and 0.1% micronutrient solution. Varying levels of sodium nitrate were added to duplicate flasks. After the pH's of the media were adjusted to predetermined levels which would result in post sterilization pH's of 6.8–7.0, the flasks were sterilized for 35 min. at 121° C. The flasks were inoculated with 3.0% by volume of 7 day liquid cultures of (1) *Spongiococcum excentricum* and (2) *Chlamydomonas agloeformis*. The flasks were aerated and agitated on a Gump rotary shaker (200 r.p.m.) for 9 days at 23–24° C. At termination, dry weights were made on the contents of the flasks and carotene and xanthophyll determinations made on the centrifuged cells. Results are shown in Table VII.

*Table VII*

The growth and carotenoid production by *Spongiococcum excentricum* and *Chlamydomonas agloeformis* in media containing 2.0% dextrose, 0.8% corn steep liquor, mineral salts and supplemented with varying levels of sodium nitrate:

| Culture | NaNO₃ | Dry wt. of cells, g./l. med. | Carotene | | Xanthophyll | |
|---|---|---|---|---|---|---|
| | | | Mg./g. dry cells | Mg./g. med. | Mg./g. dry cells | Mg./l. med. |
| Spongiococcum excentricum | 0 | 9.27 | 0.55 | 5.11 | 1.82 | 16.91 |
| | 0.2 | 8.22 | 1.81 | 14.91 | 4.47 | 36.83 |
| | 0.4 | 7.44 | 1.51 | 11.23 | 4.59 | 34.12 |
| | 0.6 | 8.04 | 1.18 | 9.61 | 2.80 | 22.80 |
| | 0.8 | 8.05 | .61 | 4.88 | 2.80 | 22.40 |
| Chlamydomonas agloeformis | 0 | 7.94 | .28 | 2.22 | 1.28 | 10.16 |
| | 0.2 | 6.84 | .83 | 5.67 | 2.85 | 19.47 |
| | 0.4 | 6.77 | .97 | 6.60 | 2.57 | 17.48 |
| | 0.6 | 7.20 | .81 | 5.83 | 2.73 | 19.66 |
| | 0.8 | 7.22 | .60 | 4.33 | 2.22 | 16.01 |

EXAMPLE VIII

Over a period of time five 100 gal. deep tank fermentors were set to check the production of xanthophyll by *Spongiococcum excentricum*. Medium in these tanks consisted of 3.0% dextrose, 0.5% corn steep liquor, 0.4% $CaNO_3$ 0.01% $KH_2PO_4$, 0.01% $MgSO_4$, 0.005% $CaCl_2$, 0.008% $FeSO_4$ and 0.1% micronutrient solution. The tanks were sterilized 30 min. at 121° C. After cooling they were inoculated with 20.0% liquid culture of

*Spongiococcum excentricum* which was from 90–110 hours old. The initial starting volume was 65 gallons. The ingredient levels were calculated on this 65 gallon starting volume. The culture in the tanks was allowed to incubate under agitation (75 r.p.m.) and aeration (5 c.f.m.) at 28° C. The tanks were terminated at varying ages as indicated in Table VIII. At termination, dry weights were made on the material and xanthophyll determination made on the centrifuged cells. As shown in Table VIII the yields of xanthophyll using $CaNO_3$ as a nitrogen supplement equaled or excelled yields obtained in laboratory shake flask studies when using a 3.0% dextrose medium.

*Table VIII*

The production of xanthophyll by *Spongiococcum excentricum* in deep tank fermentors using an initial medium consisting of 3.0% dextrose, 0.5% corn steep liquor, mineral salts and $CaNO_3$ as a nitrogen supplement:

| Series | $CaNO_3$, percent | Terminating age, hrs. | Dry wt., g./l. medium | Xanthophyll | |
|---|---|---|---|---|---|
| | | | | Mg./g. dry cells | Mg./l. medium |
| 1 | 0.4 | 114 | 18.3 | 3.83 | 70.1 |
| 2 | 0.4 | 91 | 18.6 | 4.37 | 81.3 |
| 3 | 0.4 | 88 | 20.9 | 3.44 | 72.0 |
| 4 | 0.4 | 93 | 19.5 | 3.58 | 69.8 |
| 5 | 0.4 | 90 | 20.8 | 4.12 | 85.7 |

The foregoing description and experimental data demonstrates the advantages of the present invention. As is seen, the use of inorganic nitrates with an organic nitrogen source results in significant improvement in carotenoid production. The amount of inorganic nitrate to employ is critical with optimum carotenoid production achieved when the inorganic nitrates are employed in a relatively narrow and critical range.

Those modifications and equivalents which fall within the spirit of the invention and the scope of the appended claims are to be considered part of the invention.

I claim:

1. A process for the production of carotenoids which comprises cultivating a green alga of the division Chlorophyta in an aqueous organic nutrient medium containing a fermentable carbohydrate, a proteinaceous material and more than about 0.05 percent by weight of an inorganic nitrate whose cation is of the group consisting of metals and ammonium.

2. A process for the production of carotenoids which comprises cultivating under heterotrophic conditions an alga of the division Chlorophyta in an aqueous organic nutrient medium containing a fermentable carbohydrate, between about 0.1 and about 5 percent by weight of a proteinaceous material and between about 0.05 and about 0.6 percent by weight of an inorganic nitrate whose cation is of the group consisting of metals and ammonium.

3. A process for the production of carotenoids which comprises cultivating under heterotrophic conditions an alga of the division Chlorophyta in an aqueous organic nutrient medium at a temperature from about 10° to about 40° C., said nutrient medium containing between about 0.5 and about 10 percent by weight of a carbohydrate, between about 0.1 and about 5 percent by weight of a proteinaceous material and between about 0.05 and not more than about 2.0 percent by weight of an inorganic nitrate whose cation is of the group consisting of metals and ammonium.

4. The process of claim 3 wherein the pH of the nutrient medium is from about 5.8 to 9.

5. The process of claim 3 wherein the inorganic nitrate is calcium nitrate and wherein it is employed in an amount from about 0.05 to not more than 2 percent by weight.

6. The process of claim 3 wherein the inorganic nitrate is ammonium nitrate and wherein it is employed in an amount from about 0.05 to not more than 0.4 precent by weight.

7. The process of claim 3 wherein the inorganic nitrate is sodium nitrate and wherein it is employed in an amount from about 0.05 to not more than 0.6 percent by weight.

8. The process of claim 3 wherein the inorganic nitrate is potassium nitrate and wherein it is employed in an amount from about 0.05 to not more than 0.6 percent by weight.

9. The process of claim 3 wherein the inorganic nitrate is magnesium nitrate and wherein it is employed in an amount from about 0.05 to not more than 0.6 percent by weight.

10. The process of claim 3 wherein the inorganic nitrate is manganese nitrate and wherein its employed in an amount from about 0.05 to not more than 0.6 percent by weight.

References Cited in the file of this patent

UNITED STATES PATENTS 2,949,700    Kathrein _____ Aug. 23, 1960

OTHER REFERENCES

Ellis, C., and Swaney, M. W.: Soilless Growth of Plants, New York, Reinhold, 1938, page 148.

Myers: J. Culture Conditions and the Development of the Photosynthetic Mechanism, V, Influence of the Composition of the Nutrient Medium, in Plant Physiology (magazine), 22(4): pages 590–597, October 1947.

Burlew: J. S. Algal Culture, Washington, D.C., Carnegie Institution, Publication 600, 1953, pages 59, 76, 88, 89, 95, 96, 110, 111, 155, 168, 182, 183, 301, 302.

Pruess, L., et al.: Studies on the Mass Culture of Various Algae in Carboys and Deep-Tank Fermentations in Applied Microbiology (magazine), 2(3), pages 125–130, May 1954.